(12) United States Patent
Mitsutani et al.

(10) Patent No.: US 11,601,008 B2
(45) Date of Patent: Mar. 7, 2023

(54) POWER SUPPLY DEVICE

(71) Applicant: TOYOTA JIDOSHA KABUSHIKI KAISHA, Toyota (JP)

(72) Inventors: Noritake Mitsutani, Toyota (JP); Yasuhiro Taoka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 17/365,450

(22) Filed: Jul. 1, 2021

(65) Prior Publication Data

US 2021/0323441 A1 Oct. 21, 2021

Related U.S. Application Data

(63) Continuation of application No. 16/377,512, filed on Apr. 8, 2019, now Pat. No. 11,077,770.

(30) Foreign Application Priority Data

May 23, 2018 (JP) .............................. JP2018-098920

(51) Int. Cl.
*H02J 7/00* (2006.01)
*H02J 7/34* (2006.01)
(Continued)

(52) U.S. Cl.
CPC ................ *H02J 7/342* (2020.01); *B60L 1/00* (2013.01); *B60L 50/60* (2019.02); *B60L 53/22* (2019.02); *B60L 58/10* (2019.02); *B60L 58/12* (2019.02); *B60L 58/13* (2019.02); *B60L 58/14* (2019.02); *H02J 1/082* (2020.01); *H02J 7/0013* (2013.01); *H02J 7/34* (2013.01); *B60L 58/20* (2019.02); *B60L 2210/10* (2013.01); *Y02T 10/62* (2013.01);
(Continued)

(58) Field of Classification Search
CPC ........ B60L 1/00; B60L 50/60; B60L 2210/10; B60L 58/10; B60L 58/12–14; B60L 58/20; B60L 58/22; H02J 7/0013; H02J 7/34; H02J 7/342; H02J 1/082; Y02T 10/62; Y02T 10/7072; Y02T 10/72; Y02T 90/14
USPC .................................. 320/103, 109; 701/22
See application file for complete search history.

(56) References Cited

U.S. PATENT DOCUMENTS

2007/0120529 A1   5/2007   Ishikawa et al.
2009/0015193 A1   1/2009   Esaka et al.
(Continued)

FOREIGN PATENT DOCUMENTS

CN   101160688 A   4/2008
CN   101516704 A   8/2009
(Continued)

*Primary Examiner* — Zixuan Zhou
(74) *Attorney, Agent, or Firm* — Oliff PLC

(57) ABSTRACT

A power supply device is mountable to a vehicle and includes: a high-voltage battery; a low-voltage battery of which an output voltage is lower than that of the high-voltage battery, and which can be charged by output power from the high-voltage battery; and a control unit configured to perform charging/discharging control for the high-voltage battery and the low-voltage battery. The control unit performs feeding control for causing the high-voltage battery to supply power to a predetermined on-vehicle device while consumed power is higher than a predetermined value in a state in which a main switch of the vehicle is not on.

7 Claims, 7 Drawing Sheets

(51) Int. Cl.
    *B60L 53/22* (2019.01)
    *B60L 50/60* (2019.01)
    *B60L 58/13* (2019.01)
    *B60L 58/12* (2019.01)
    *H02J 1/08* (2006.01)
    *B60L 58/14* (2019.01)
    *B60L 1/00* (2006.01)
    *B60L 58/10* (2019.01)
    *B60L 58/20* (2019.01)

(52) U.S. Cl.
    CPC ............ *Y02T 10/7072* (2013.01); *Y02T 10/72* (2013.01); *Y02T 90/14* (2013.01)

(56) References Cited

U.S. PATENT DOCUMENTS

2010/0001523 A1    1/2010    Sato et al.
2012/0299377 A1    11/2012    Masuda et al.
2014/0203759 A1*    7/2014    Sugiyama ............... B60L 58/15
                                                                                   320/104
2014/0214251 A1    7/2014    Sugiyama
2015/0258911 A1    9/2015    Sugiyama
2017/0093316 A1    3/2017    Toyora
2018/0252774 A1*    9/2018    Ciaccio ................ G01R 31/388

FOREIGN PATENT DOCUMENTS

| | | |
|---|---|---|
| CN | 103963725 A | 8/2014 |
| CN | 104955699 A | 9/2015 |
| EP | 2 065 268 A1 | 6/2009 |
| EP | 2535218 A1 | 12/2012 |
| JP | 2005-020854 A | 1/2005 |
| JP | 4370297 B2 | 11/2009 |
| JP | 2012-050281 A | 3/2012 |
| JP | 5293841 B2 | 9/2013 |
| JP | 2014-138536 A | 7/2014 |
| JP | 2014-141209 A | 8/2014 |
| JP | 2014-143868 A | 8/2014 |
| KR | 10-2009-0064580 A | 6/2009 |
| WO | 2014/115015 A1 | 7/2014 |

\* cited by examiner

POWER SUPPLY DEVICE

CROSS-REFERENCE TO RELATED APPLICATION

This is a Continuation of application Ser. No. 16/377,512 filed Apr. 8, 2019, which claims the benefit of Japanese Patent Applications No. 2018-098920 filed May 23, 2018. The disclosure of the prior applications is hereby incorporated by reference herein in its entirety.

BACKGROUND OF THE INVENTION

Field of the Invention

The present invention relates to a power supply device mountable to a vehicle and the like.

Description of the Background Art

In vehicles and the like, a power supply device that includes a high-voltage battery (main battery), and a low-voltage battery (auxiliary machine battery) of which the output voltage is lower than that of the high-voltage battery, is used. The high-voltage battery and the low-voltage battery are connected to each other via a DCDC converter. The high-voltage battery, a motor generator (MG), and the like are disposed on the high voltage side of the DCDC converter, to configure a high voltage power system. Meanwhile, the low-voltage battery, and an on-vehicle device called an auxiliary machine such as an air conditioner and an audio device are disposed on the low voltage side of the DCDC converter, to configure a low voltage power system. An output voltage of the high-voltage battery is stepped down by the DCDC converter, and the stepped-down voltage is supplied to the low voltage power system, and the low-voltage battery can be charged and the auxiliary machine can be driven by the output power of the high-voltage battery.

Patent Literature 1 (Japanese Laid-Open Patent Publication No. 2014-138536) discloses a vehicle power supply device that charges a low-voltage battery by using output power of a high-voltage battery when the vehicle is parked. Thus, the low-voltage battery is inhibited from being over-discharged due to standby current when the vehicle is parked. The high-voltage battery is charged during running. A power storage amount includes a power storage amount with which the low-voltage battery is to be charged. Control is performed such that the greater an average value of times in which the vehicle has been previously parked is, the greater a power storage amount for the high voltage battery is.

Patent Literature 2 (Japanese Laid-Open Patent Publication No. 2012-50281) discloses a charging system in which a target power storage amount in charging of a low-voltage battery is set to be less when a power storage amount of a high-voltage battery is low, as compared to when a power storage amount of the high-voltage battery is high, whereby an amount of power to be fed to the low-voltage battery in the case of a power storage amount of the high-voltage battery being small, is reduced, and power used for running is saved.

Computerization of vehicles and enhancement of functions have progressed, so that an auxiliary machine which consumes relatively high power is required to operate even when a vehicle is not running. For example, an auxiliary machine, such as an electronic mirror for displaying an image of the rear side or the like with the use of a camera and a display device, and a getting-out support system for detecting a vehicle or the like which approaches from the rear side or the like, by using a sensor or the like, and performing warning, is required to operate even when a main switch (start switch or an ignition switch) is off. If power is supplied from the low-voltage battery to the auxiliary machine, a DOD (depth of discharge) of the low-voltage battery increases, and this may lead to deterioration of performance and reduction of lifespan.

SUMMARY OF THE INVENTION

The present invention is made in view of the aforementioned problem, and an object of the present invention is to provide a power supply device that inhibits performance of a low-voltage battery from deteriorating.

In order to solve the aforementioned problem, one aspect of the present invention is directed to a power supply device, mountable to a vehicle, which includes: a high-voltage battery; a low-voltage battery of which an output voltage is lower than that of the high-voltage battery, and which can be charged by output power from the high-voltage battery; and a control unit configured to perform charging/discharging control for the high-voltage battery and the low-voltage battery. The control unit performs feeding control for causing the high-voltage battery to supply power to a predetermined on-vehicle device while consumed power is higher than a predetermined value in a state in which a main switch of the vehicle is not on.

Therefore, in a case where the main switch is off, power can be fed and supplied from the high-voltage battery to the predetermined on-vehicle device, whereby reduction of the SOC of the low-voltage battery can be inhibited.

Furthermore, the control unit may perform supplementary charging for charging the high-voltage battery while the vehicle is running, so as to increase a charged amount for the high-voltage battery by a power storage amount corresponding to an amount of power, to be fed, which is an estimated amount of power to be supplied from the high-voltage battery to the predetermined on-vehicle device in the feeding control during a subsequent non-running time period, as compared to a case where the vehicle does not include the predetermined on-vehicle device.

Therefore, the high-voltage battery can be replenished, during running, with an amount of power discharged by the feeding.

Furthermore, the control unit may determine a required time for the supplementary charging, based on the amount of power to be fed and a charging/discharging capability of a power supply device, and a trip time estimated from history of running.

Furthermore, the control unit may determine an amount of increase of a power storage amount of the high-voltage battery for the supplementary charging, an amount of reduction of a power storage amount of the high-voltage battery for the feeding control, and the required time such that an average fuel economy deterioration amount is less than or equal to a predetermined value as compared to a case where the feeding control and the supplementary charging are not performed.

Thus, the feeding control and supplementary charging control can be advantageously performed.

As described above, according to the present invention, even when a main switch is off, power can be fed and supplied from a high-voltage battery to a predetermined on-vehicle device. Therefore, also when power consumption of the predetermined on-vehicle device is high, the SOC of a low-voltage battery is not reduced, and deterioration of the quality of the low-voltage battery and reduction of the lifespan can be inhibited.

DESCRIPTION OF THE PREFERRED EMBODIMENTS (Overview)

A power supply device of the present invention includes a high-voltage battery and a low-voltage battery, and a DCDC converter steps down a voltage on the high-voltage battery side, and supplies the stepped-down voltage to a low-voltage battery side. Also when a main switch is not on, the DCDC converter operates, and power from the high-voltage battery is supplied to an auxiliary machine. Thus, deterioration of performance due to overdischarging of the low-voltage battery can be inhibited.

(Embodiment)

One embodiment of the present invention will be described below in detail with reference to the drawings.

<Configuration>

Figure 1:
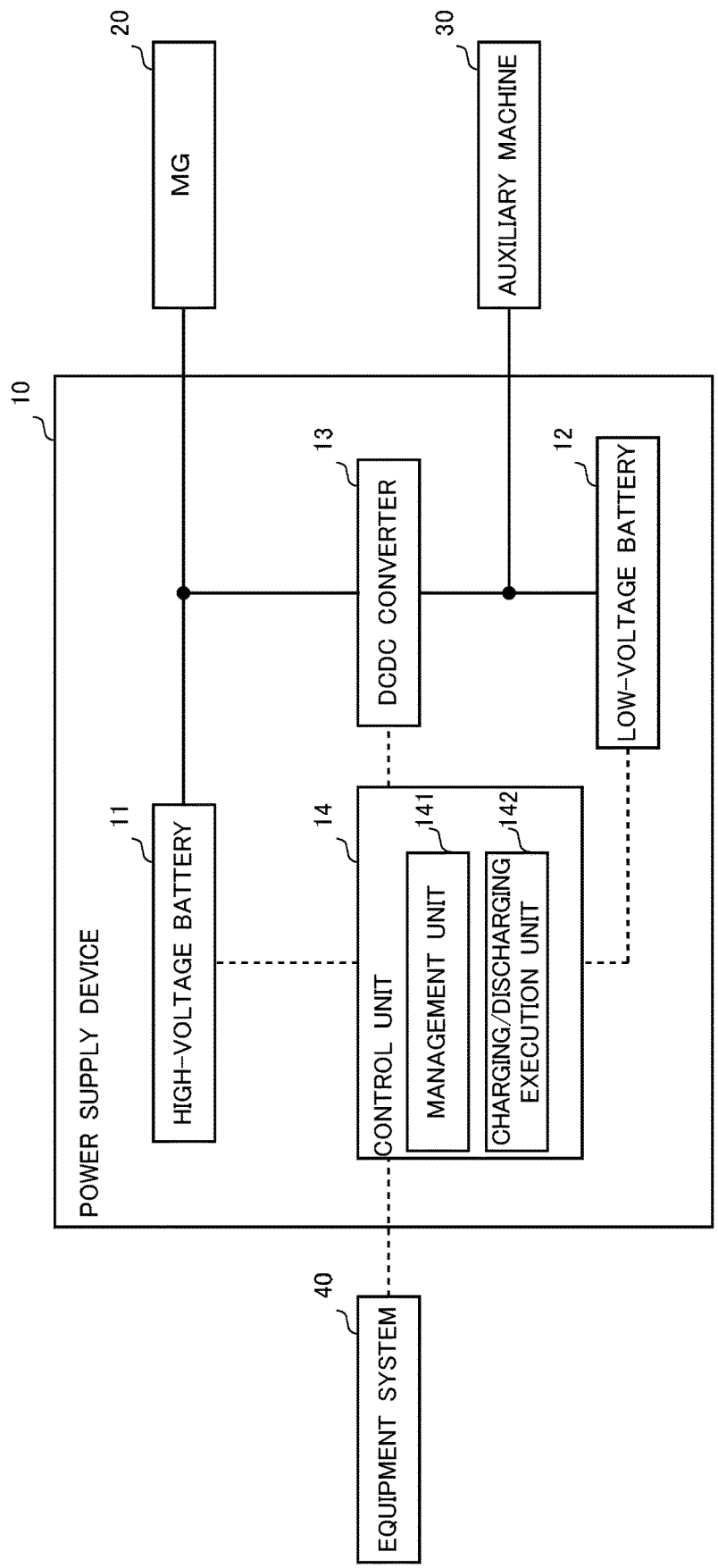
FIG. 1 is a functional block diagram illustrating a power supply device according to one embodiment of the present invention.

FIG. 1 is a functional block diagram illustrating a power supply device 10 according to the present embodiment. The power supply device 10 is mounted to a vehicle, and includes a high-voltage battery 11 (main battery), a low-voltage battery 12 (auxiliary machine battery) of which the output voltage is lower than that of the high-voltage battery 11, a DCDC converter 13, and a control unit 14. The high-voltage battery 11 and the low-voltage battery 12 are connected to each other via the DCDC converter 13. The high-voltage battery 11 side with respect to the DCDC converter 13 is a high voltage power system. A load of a high-voltage system such as a motor generator (MG) 20, and a generator, or a charger and the like are connected to the high voltage power system. The low-voltage battery 12 side with respect to the DCDC converter 13 is a low voltage power system. An auxiliary machine 30 such as an air conditioner, an audio device, an electronic mirror, and a getting-out support system is connected to the low voltage power system. The auxiliary machine 30, such as an electronic mirror and a getting-out support system, which is required to operate also when a main switch is off while a vehicle is not running, and in which consumed power by operation of the auxiliary machine 30 becomes greater than a predetermined value, is referred to as a specific auxiliary machine 30. A voltage of the high voltage power system is stepped down by the DCDC converter 13 and the stepped-down voltage is supplied to the low voltage power system, so that the low-voltage battery 12 can be charged or the auxiliary machine 30 can be driven. Furthermore, the power supply device 10 can obtain, from an equipment system 40 of a vehicle, information representing various states of the vehicle and an operation performed on the vehicle.

The control unit 14 includes: a management unit 141 and a charging/discharging execution unit 142. The management unit 141 determines contents for control such as a charge/discharge amount for the high-voltage battery 11 and the low-voltage battery 12, and an amount of power to be supplied to each of the MG 20 and the auxiliary machine 30, according to, for example, various states of the high-voltage battery 11, various states of the low-voltage battery 12, power required from the auxiliary machine 30, and an operation, performed on the vehicle, which is obtained from the equipment system 40. The charging/discharging execution unit 142 controls the DCDC converter 13 and the like according to the contents for control which are determined by the management unit 141, to charge/discharge the high-voltage battery 11 and the low-voltage battery 12.

<Outline of Process>

Figure 2:
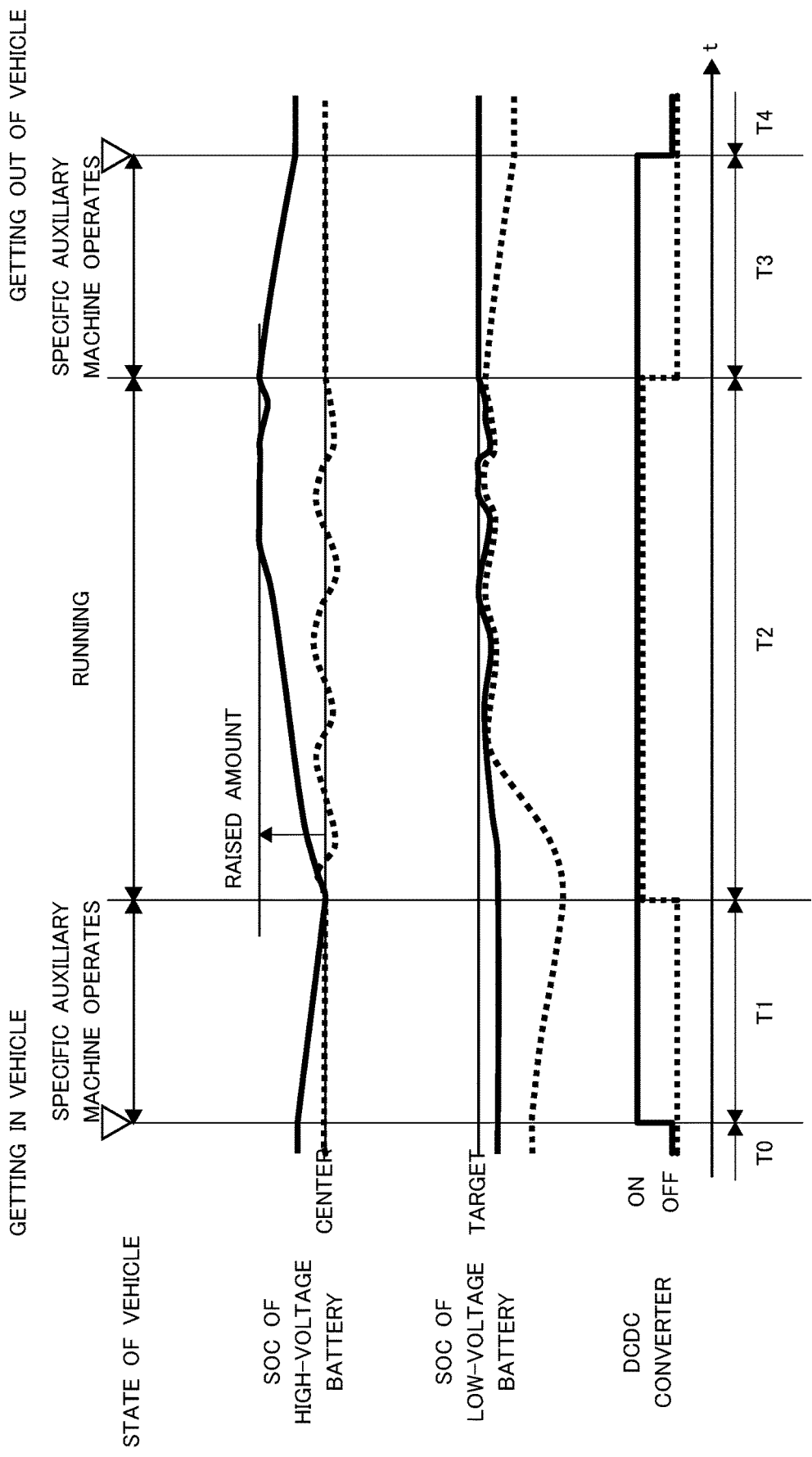
FIG. 2 is a time chart showing a process performed by the power supply device according to one embodiment of the present invention.

An example of a process performed by the power supply device 10 according to the present embodiment will be described below. FIG. 2 is a time chart showing the process performed by the power supply device 10.

In the time chart shown in FIG. 2, a solid line represents a case where, as in the present invention, power supply (hereinafter, referred to as feeding) from the high-voltage battery 11 to the specific auxiliary machine 30 is performed while the main switch is off and the vehicle is not running, and a dotted line represents a case where the feeding is not performed.

In the present embodiment, as shown in FIG. 2, in at least a time period T1 from a time when a user gets in a vehicle, to a time when the main switch becomes on to enter a running state, the DCDC converter 13 operates and the feeding is performed (process before running).

In a time period T2 in a running state from a time when the main switch has become on, to a time when the main switch becomes off, the high-voltage battery 11 is charged by the MG 20. At this time, a target value of a SOC (power storage amount) is set to be greater than the SOC center value such that the high-voltage battery 11 is charged by an amount of power equivalent to an amount of power to be fed from the high-voltage battery 11 while the vehicle is not running. The SOC center value is a target value of a power storage amount in the charging/discharging control, and is set to, for example, a value preferable for inhibiting deterioration of the high-voltage battery 11 and inhibiting fuel economy deterioration in general. Hereinafter, a charging state, in which the high-voltage battery 11 is charged such that an amount of power with which the high-voltage battery 11 is charged is increased by an amount of power to be fed from the high-voltage battery 11 while the vehicle is not running as compared to a case where the specific auxiliary machine 30 is not provided, is referred to as supplementary charging. Furthermore, in the time period T2, power is supplied from the low-voltage battery 12 to the auxiliary machine 30, and the DCDC converter 13 operates so as to supply power from the high voltage power system to the low voltage power system such that the SOC of the low-voltage battery 12 becomes a predetermined target value (process during running).

Thereafter, in a time period T3 from a time when the main switch has become off to enter a non-running state, at least to a time when a user gets out of the vehicle, the DCDC converter 13 continues to operate and the feeding is performed (process after running).

Thereafter, when the user has got out of the vehicle, the DCDC converter 13 stops and the specific auxiliary machine 30 stops operating.

By such a control being performed, as shown in FIG. 2, in the time periods T1, T3, the SOC of the low-voltage battery 12 does not significantly decrease and the DOD does not increase, whereby deterioration of the low-voltage battery 12 can be inhibited. In a time period T0 before the time period T1 or in a time period T4 after the time period T3, although the SOC slightly decreases due to self-discharge of the low-voltage battery 12, the degree is smaller as compared to a case indicated by the dotted line.

The above-described process will be described below in detail.

<Process Before Running>

Figure 3:
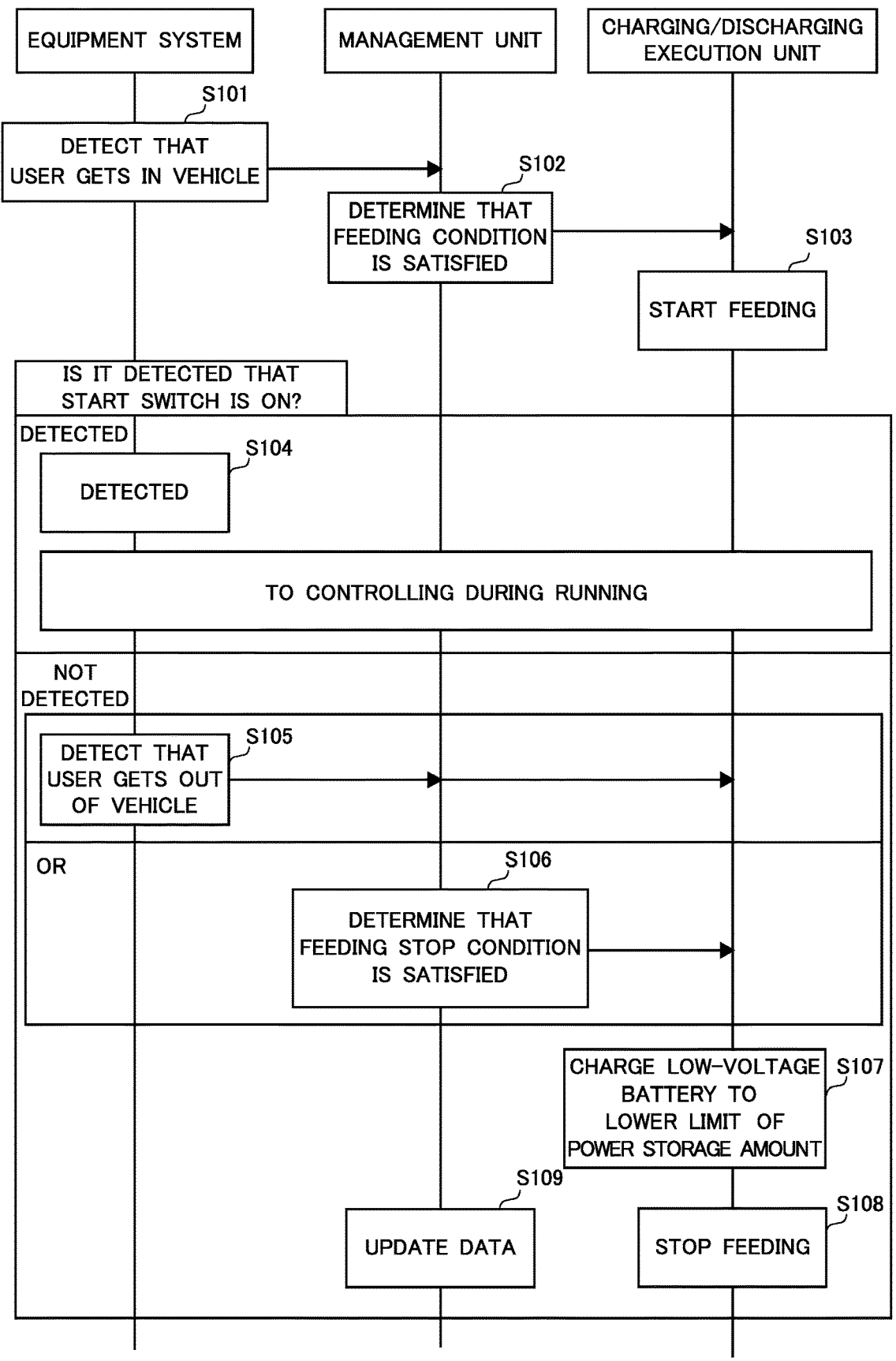
FIG. 3 is a sequence diagram illustrating the process performed by the power supply device according to one embodiment of the present invention.

FIG. 3 is a sequence diagram illustrating the process before running in the power supply device 10. In the time period T0 when a user has not got in a vehicle, the vehicle is not running, and the main switch is off, the equipment system 40 is in a stand-by state in order to detect for an operation performed on the vehicle.

(Step S101): The equipment system 40 detects that a user has got in the vehicle, and notifies the management unit 141 of the control unit 14 thereof. It is detected that the user has got in the vehicle, by, for example, detecting a predetermined operation, such as opening of a door, performed by the user. In a case where the user opens and closes the door in a short period of time, the user may not get in the vehicle. Therefore, accuracy for detecting that the user has got in the vehicle may be enhanced by using, for example, elapse of time after the door has been opened. The predetermined operation is not limited to an operation of a door, and may be another operation. Furthermore, various sensors such as a getting-in sensor may be used to detect that the user has been seated. A seat to be detected in the seating operation may be merely a driver's seat, or may include another seat.

(Step S102): The management unit 141 receives the notification from the equipment system 40 and determines whether or not the feeding condition is satisfied. The feeding condition is, for example, a condition that the SOC of the high-voltage battery 11 is greater than or equal to a predetermined value, a condition that the number of times of executing this process after the main switch has previously become off is less than or equal to a predetermined number of times, or a condition that an energizing time of a PCU (power control unit) in an immediately preceding predetermined time period is less than or equal to a predetermined value. The number of times of executing the process and the energizing time can be obtained by, for example, referring to a log. Thus, the feeding condition is set so as not to be satisfied when, for example, this process is repeatedly performed in a short period of time, and load on the high voltage power system is high. When the feeding condition is not satisfied, this process is ended. When the feeding condition is satisfied, the management unit 141 notifies the charging/discharging execution unit 142 of the control unit 14 of an instruction for starting the feeding, and the process proceeds to the subsequent step S103.

(Step S103): The charging/discharging execution unit 142 operates the DCDC converter 13 and starts the feeding, to operate the specific auxiliary machine 30. The charging/discharging execution unit 142 preferably monitors an output power from the high-voltage battery 11, and controls (performs output guard) the DCDC converter 13 so as not to output power higher than or equal to a limit value, thereby inhibiting deterioration of the quality such as overdischarging of the high-voltage battery 11. The feeding may be performed not only when the main switch is off, but also when an accessory mode in which power can be supplied from the low-voltage battery 12 to the entirety of the auxiliary machine 30 is set.

(Step S104): When the equipment system 40 detects that a user performs an operation of causing the main switch to be on, the process shifts to the process during running as described below.

(Step S105): Even when the user has got in the vehicle, the user may get out of the vehicle without causing the main switch to be on. In this step, the equipment system 40 detects that the user has got out of the vehicle, and notifies the management unit 141 thereof. It is detected that the user has got out of the vehicle, by, for example, detecting a predetermined operation performed by the user in which the door is opened and then closed, and the door is further locked. The predetermined operation is not limited to the operation of the door, and may be another operation. Furthermore, various sensors such as a getting-in sensor may be used to detect that the user has got out of the vehicle. The equipment system 40 or the management unit 141 notifies the charging/discharging execution unit 142 of an instruction for stopping the feeding, and the process proceeds to step S107.

(Step S106): Even when the user has got in the vehicle, the main switch may not be operated to be on, and the user may be in the vehicle for a long time without getting out of the vehicle. In this step, the management unit 141 monitors the feeding state, and, when a predetermined feeding-stop condition is satisfied, the management unit 141 notifies the charging/discharging execution unit 142 of an instruction for stopping the feeding, and the process proceeds to step S107. In the description herein, the feeding-stop condition is, for example, a condition that a predetermined or longer time has elapsed after the start of the feeding, or a condition that the SOC of the high-voltage battery 11 is less than a predetermined value. Thus, the feeding-stop condition is set so as to be satisfied when, for example, load on the high voltage power system is high.

(Step S107): The charging/discharging execution unit 142 obtains the SOC of the low-voltage battery 12, and, when the SOC is greater than or equal to a predetermined lower limit value, the process proceeds to step S108. When the SOC of the low-voltage battery 12 is less than the predetermined lower limit value, the feeding is continued until the SOC reaches the lower limit value.

(Step S108): The charging/discharging execution unit 142 stops the DCDC converter to stop the feeding.

(Step S109): The management unit 141 performs updating of various log data such as incrementing of the number of times of the execution described above for step S102, and adding of results of the feeding execution time, an amount of fed power, and the like.

<Process During Running>

Figure 4:
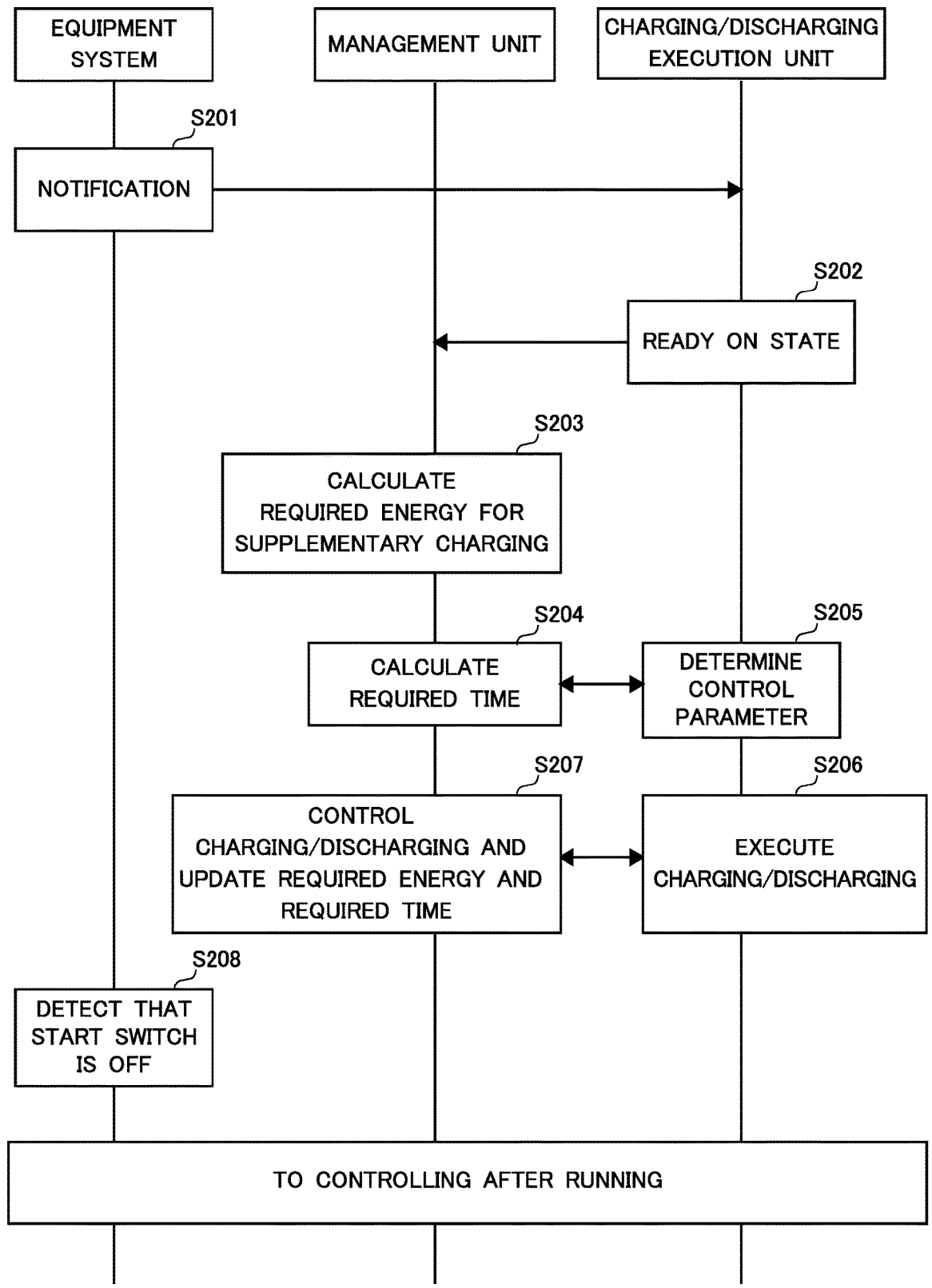
FIG. 4 is a sequence diagram illustrating the process performed by the power supply device according to one embodiment of the present invention.

FIG. 4 is a sequence diagram illustrating the process during running which is performed by the power supply device 10.

(Step S201): The equipment system 40 notifies the charging/discharging execution unit 142 that an operation of causing the main switch to be on has been detected.

(Step S202): The charging/discharging execution unit 142 shifts to a Ready ON state representing a state in which power can be supplied to the MG 20 and the vehicle can be caused to run, and notifies the management unit 141 thereof.

(Step S203): The management unit 141 calculates an estimated amount of power to be fed from the high-voltage battery 11 to the specific auxiliary machine 30 in the feeding in the subsequent following non-running time period. This can be calculated by, for example, estimation based on a log representing history of discharging during non-running, or the like. The calculated amount of power is set to an amount of increase (required energy in supplementary charging) of a power storage amount for the high-voltage battery 11 as compared to a case where the feeding is not performed.

(Step S204): The management unit 141 calculates a time required for the supplementary charging. This is calculated so as to be, for example, within a trip time estimated according to the history of running. In the description herein, the trip typically represents a time period from the start of running to the end thereof, and is defined by a predetermined method based on a chronological pattern of running and stop of a vehicle.

(Step S205): In parallel with step S204, the charging/discharging execution unit 142 determines a control parameter for charging and discharging. The control parameter is, for example, the center SOC of the high-voltage battery 11 determined for inhibiting deterioration of the high-voltage battery 11 and inhibiting fuel economy deterioration, a lower limit SOC that is an allowable lower limit value of the SOC, or an amount of increase (raised amount), from the center SOC of the charge target value, for the supplementary charging. The management unit 141 in step S204 communicates with the charging/discharging execution unit 142 in this step, to inquire whether or not charging with required energy in supplementary charging can be performed in the required time, by charge control with a charging/discharging capability (availability) within the allowable range defined by the control parameter. When the charging cannot be performed, the required time is preferably corrected such that the charging can be performed. Thus, the required time is determined by an abstracted request and response interface between the management unit 141 and the charging/discharging execution unit 142.

(Step S206): The charging/discharging execution unit 142 performs charging/discharging control for the high-voltage battery 11 and the low-voltage battery 12 based on, for example, the control parameter determined in step S205 or a target value of the SOC of the low-voltage battery 12, and drives the MG 20 and the auxiliary machine 30 while maintaining the SOC of each of the high-voltage battery 11 and the low-voltage battery 12 within a preferable range.

(Step S207): The management unit 141 constantly communicates with the charging/discharging execution unit 142 and obtains a state of the supplementary charging, and updates required energy for supplementary charging and the required time for the supplementary charging until the supplementary charging is ended.

(Step S208): When the equipment system 40 detects an operation performed by the user for causing the main switch to be off, the process shifts to the process after running as described below.

<Process after Running>

Figure 5:
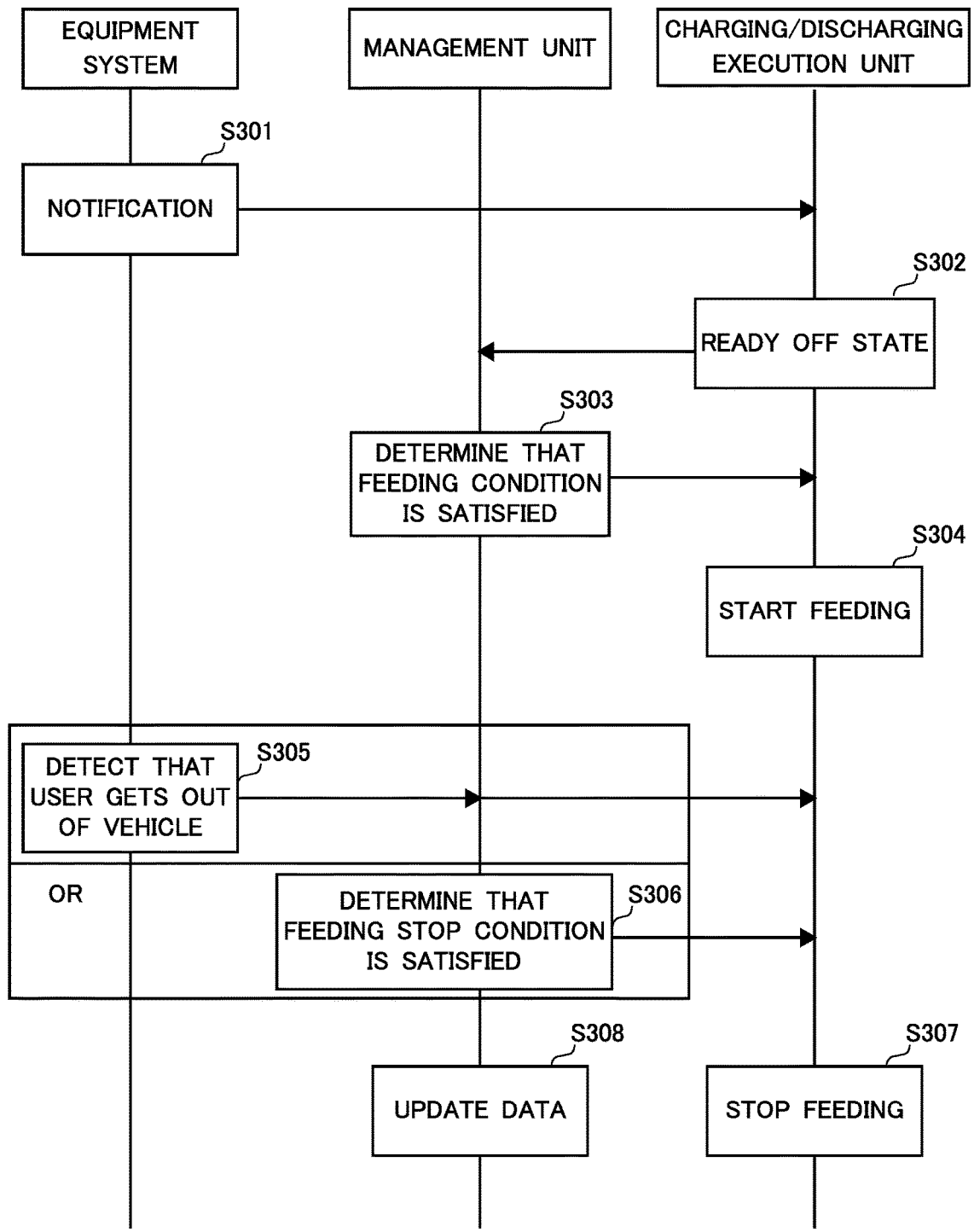
FIG. 5 is a sequence diagram illustrating the process performed by the power supply device according to one embodiment of the present invention.

FIG. 5 is a sequence diagram illustrating the process after running which is performed by the power supply device 10.

(Step S301): The equipment system 40 notifies the charging/discharging execution unit 142 that an operation of causing the main switch to be off has been detected.

(Step S302): The charging/discharging execution unit 142 stops supplying power to the MG 20, and shifts to a Ready OFF state representing a non-running state of the vehicle, and notifies the management unit 141 thereof. Furthermore, the charging/discharging execution unit 142 may update the above-described availability, and notifies the management unit 141 thereof.

(Step S303): The management unit 141 determines whether or not the feeding condition is satisfied, as in step S102 described above. In this step, the feeding condition is, for example, a condition that the SOC of the high-voltage battery 11 is greater than or equal to a predetermined value. Thus, the feeding condition is set so as not to be satisfied when, for example, this process is repeatedly performed in a short period of time, and load on the high voltage power system is high. When the feeding condition is not satisfied, this process is ended. When the feeding condition is satisfied, the management unit 141 notifies the charging/discharging execution unit 142 of an instruction for starting the feeding, and the process proceeds to the subsequent step S304.

(Step S304): The charging/discharging execution unit 142 starts the feeding, to operate the specific auxiliary machine 30. The charging/discharging execution unit 142 preferably monitors output power from the high-voltage battery 11, and controls (performs output guard) the DCDC converter so as not to output power higher than or equal to a limit value, thereby inhibiting the quality of the high-voltage battery 11 from deteriorating.

(Step S305): In this step, the equipment system 40 detects that a user has got out of the vehicle, and notifies the management unit 141 thereof. It is detected that the user has got out of the vehicle, by, for example, detecting a predetermined operation performed by the user in which the door is opened and then closed. The predetermined operation is not limited to the operation of the door, and may be another operation. Furthermore, various sensors such as a getting-in sensor may be used to detect that the user has got out of the vehicle. The equipment system 40 or the management unit 141 notifies the charging/discharging execution unit 142 of an instruction for stopping the feeding, and the process proceeds to step S307.

(Step S306): Even when a user causes the main switch to be off, the user may be in the vehicle for a long time without getting out of the vehicle. In this step, the management unit 141 monitors the feeding state, and, when a predetermined feeding stop condition is satisfied, the management unit 141 notifies the charging/discharging execution unit 142 of an instruction for stopping the feeding, and the process proceeds to step S307. The feeding stop condition is, for example, a condition that a predetermined or longer time has elapsed after the start of the feeding, or a condition that the SOC of the high-voltage battery 11 is less than a predetermined value. Thus, the feeding stop condition is set so as to be satisfied when, for example, load on the high voltage power system is high.

(Step S307): The charging/discharging execution unit 142 stops the DCDC converter to stop the feeding.

(Step S308): The management unit 141 performs data updating such as storing the trip time, resetting the number of times of the execution described above for step S102, and adding of results of the feeding execution time, an amount of fed power, and the like to the log described in step S203. In the updating of various data, updating, such as storing of the trip time and resetting of the number of times of execution as described above, which is not influenced by the feeding result after running, may be performed after step S302 before step S303. When the user causes the main switch to be on without getting out of the vehicle, the process may proceed again to the process during running described above.

Figure 6:
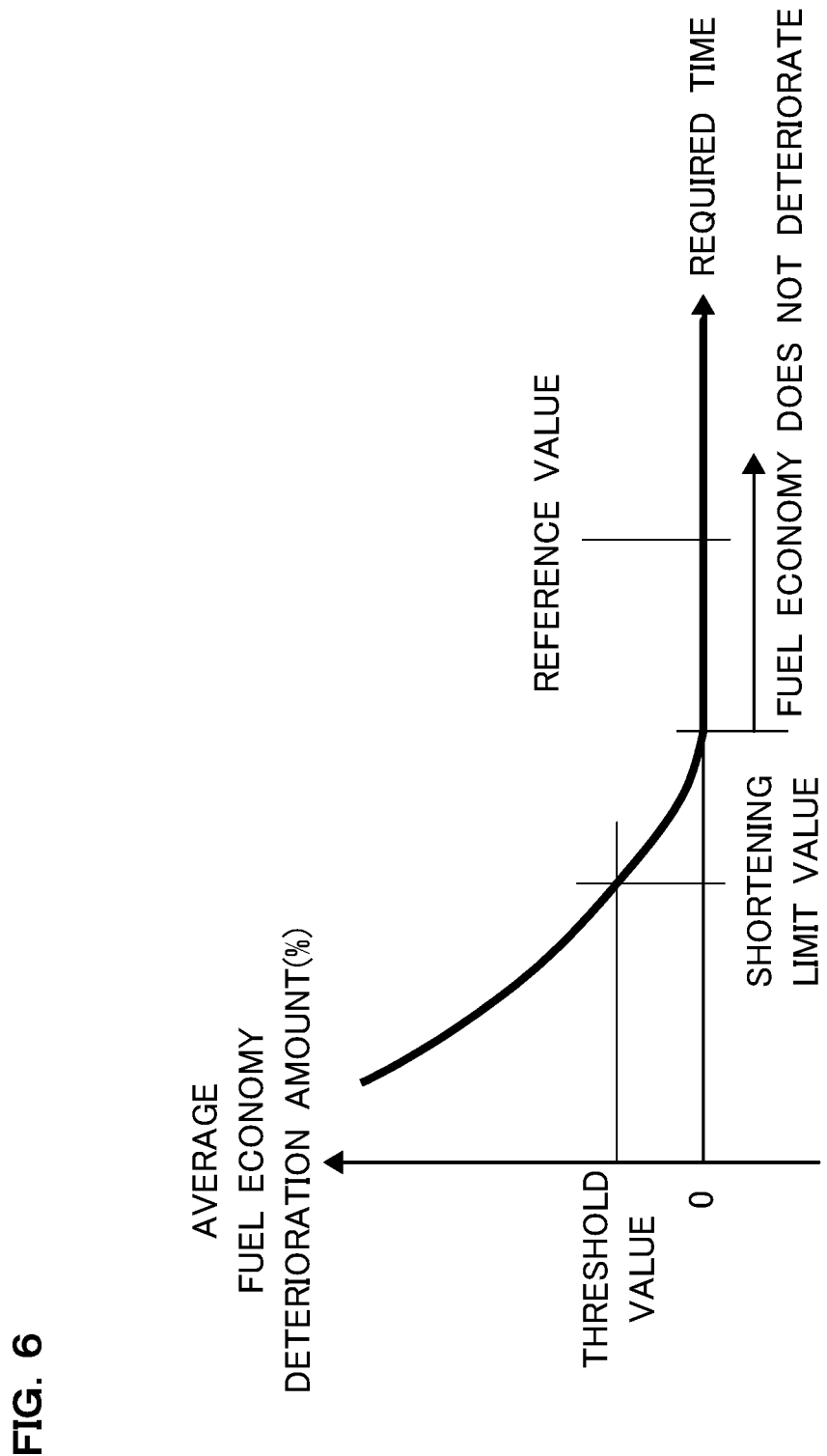
FIG. 6 illustrates a relationship between a required time for supplementary charging and an average fuel economy deterioration amount in the power supply device according to one embodiment of the present invention.

FIG. 6 illustrates a relationship between a required time for supplementary charging and an average fuel economy deterioration amount as compared to a case where no feeding is performed. As shown in FIG. 6, when the required time is less than a predetermined value, an amount of generated power per unit time needs to be increased, and the fuel economy thus deteriorates as compared to a case where no feeding is performed. When the required time is greater than or equal to the predetermined value, the fuel economy does not deteriorate as compared to a case where no feeding is performed. This is because, even when no feeding is performed, the low-voltage battery 12, in which the SOC is greatly reduced, is charged during running over a certain period of time, whereby the influence on fuel economy is almost the same. In general, the required time is preferably set such that a value within a range in which fuel economy does not deteriorate is set to a reference value.

However, when an estimated trip time is short depending on a user's usage state, the supplementary charging may not be completed during the trip. In this case, the average fuel economy deterioration may be allowed so as to be reduced to a predetermined threshold value or smaller value, and the required time may be set so as to be short such that the required time is greater than or equal to a predetermined shortening limit value.

Figure 7:
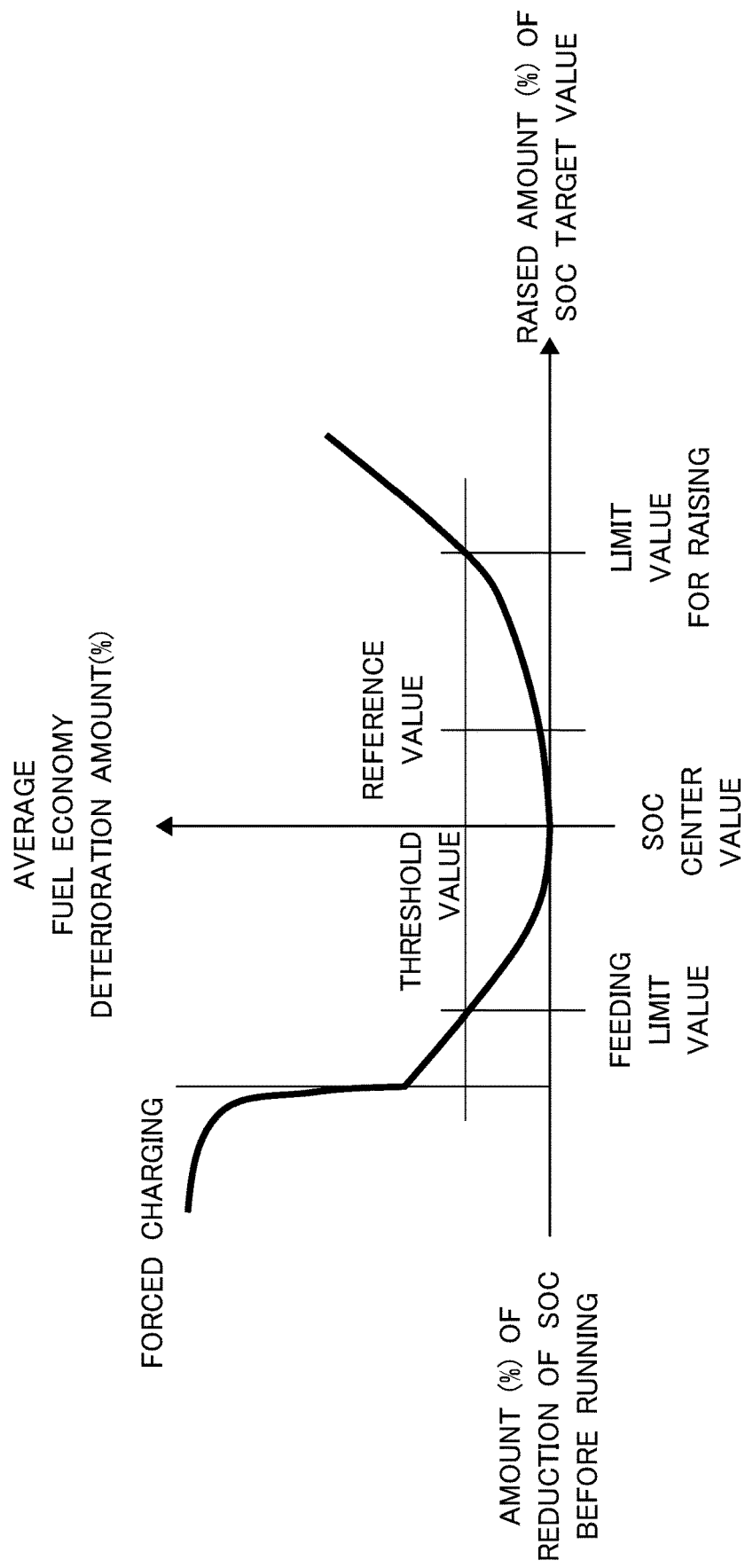
FIG. 7 illustrates a relationship between a target power storage amount and a fuel economy deterioration amount, and a relationship between a fuel economy deterioration amount and an amount of reduction of a power storage amount of a high-voltage battery, in supplementary charging in the power supply device according to one embodiment of the present invention.

FIG. 7 illustrates a relationship between a fuel economy deterioration amount, and a raised amount from the SOC center value of the target value of the SOC of the high-voltage battery 11 in charging/discharging control during running, and a relationship between a fuel economy deterioration amount, and an amount of reduction of the SOC of the high-voltage battery 11 due to feeding before running. When a raised amount is increased, an intake amount of regenerative power is reduced and fuel economy deteriorates. Therefore, a raised amount in the supplementary charging is preferably set such that a value in a range within which deterioration of the fuel economy is relatively small is set to a reference value. Furthermore, when a fed amount is great, frequency with which an engine starts increases, and fuel economy deteriorates. Therefore, an amount of SOC reduction due to feeding is set to zero in general, and the SOC is controlled so as not to be less than the SOC center value as shown in FIG. 2.

However, for example, when a time period from a user's getting in the vehicle, to start of running, or a time period from the end of running to the user's getting out of the vehicle is long, or when the number of times the user temporarily gets in and gets out of the vehicle is great during trip, depending on a user's usage state, an amount of fed power increases. In this case, the average fuel economy deterioration may be allowed to be less than or equal to a predetermined threshold value, and a raised amount may be set so as to be less than or equal to a predetermined limit value for raising. Furthermore, an amount of SOC reduction may be set so as to be less than or equal to a predetermined feeding limit value and the SOC may be allowed to be less than the SOC center value such that the average fuel economy deterioration does not exceed a predetermined threshold value.

When the supplementary charging is not completed, or when an amount of fed power exceeds a predetermined amount and the SOC of the high-voltage battery 11 is less than a lower limit value, even in the above-described operation, feeding from the high-voltage battery 11 may not be performed or may be stopped, and power supply may be switched to power supply from the low-voltage battery 12.

(Effect)

According to the present invention, even when the main switch is off, power can be fed and supplied to a specific auxiliary machine from a high-voltage battery. Therefore, even when power consumption of the specific auxiliary machine is high, the SOC of the low-voltage battery is not reduced, and deterioration of the quality of the low-voltage battery and reduction of the lifespan can be inhibited. Furthermore, the high-voltage battery is charged during running so as to increase a charged amount by an amount of power to be supplied from the high-voltage battery to the specific auxiliary machine as compared to a case where a specific auxiliary machine is not provided, whereby power loss due to unnecessary charging and discharging and influence that causes fuel economy deterioration can be reduced. Furthermore, by determining whether or not feeding can be performed based on an energizing time of the PCU, or the like, components can be protected in terms of durability. Furthermore, the management unit determines a required time for charging the high-voltage battery with an amount of power to be fed, according to abstracted request and response based on required energy and charging and discharging capability, between the management unit and the charging/discharging execution unit. Therefore, designing for matching characteristics of individual elements to be controlled among many components, is unnecessary, and designing for an interface and internal processing, and mounting are facilitated.

In the above description, the vehicle is a hybrid vehicle which includes an engine and an alternator. However, the present invention is applicable also to an electric car having no engine and alternator, to perform the feeding, thereby inhibiting deterioration of quality of a low-voltage battery and reduction of the lifespan.

The present invention can be implemented by not only the power supply device but also a method and a program executed by a computer of the power supply device, a computer-readable non-transitory storage medium having the program stored therein, or a vehicle having the power supply device mounted therein.

The present invention is useful for a power supply device in a vehicle or the like.

What is claimed is:

1. A power supply device mountable to a vehicle, the power supply device comprising:
   a high-voltage battery;
   a low-voltage battery of which an output voltage is lower than that of the high-voltage battery, and which can be charged by output power from the high-voltage battery;
   a detection unit configured to detect an occupant; and
   a control unit configured to:
   perform charging/discharging control for the high-voltage battery and the low-voltage battery; and perform feeding control for causing the high-voltage battery to supply power to a predetermined on-vehicle device when a condition including at least that the occupant is detected is satisfied in a state in which a main switch of the vehicle is not on.

2. The power supply device according to claim 1, wherein the control unit is configured to perform supplementary charging for charging the high-voltage battery while the vehicle is running, so as to increase a charged amount for the high-voltage battery by a power storage amount corresponding to an amount of power, to be fed, which is an estimated amount of power to be supplied from the high-voltage battery to the predetermined on-vehicle device in the feeding control during a subsequent non-running time period, as compared to a case where the vehicle does not include the predetermined on-vehicle device.

3. The power supply device according to claim 2, wherein the control unit is configured to determine a required time for the supplementary charging, based on the amount of power to be fed and a charging/discharging capability of the power supply device, and a trip time estimated from history of running.

4. The power supply device according to claim 3, wherein the control unit is configured to determine an amount of increase of a power storage amount of the high-voltage battery for the supplementary charging, an amount of reduction of a power storage amount of the high-voltage battery for the feeding control, and the required time such that an average fuel economy deterioration amount is less than or equal to a predetermined value as compared to a case where the feeding control and the supplementary charging are not performed.

5. The power supply device according to claim 1, wherein the control unit is configured to end the feeding control when the occupant is not detected.

6. A non-transitory computer readable medium that stores computer executable program instructions by a computer of a power supply device mountable to a vehicle, the power supply device being provided with a high-voltage battery, and a low-voltage battery of which an output voltage is lower than that of the high-voltage battery, and which can be charged by output power from the high-voltage battery, the program instructions causing the computer to execute:
  a detection step of detecting an occupant; and
  a control step of:
    performing charging/discharging control for the high-voltage battery and the low-voltage battery; and
    performing feeding control for causing the high-voltage battery to supply power to a predetermined on-vehicle device when a condition including at least that the occupant is detected is satisfied in a state in which a main switch of the vehicle is not on.

7. A method executed by power supply device mountable to a vehicle, the power supply device being provided with a high-voltage battery, and a low-voltage battery of which an output voltage is lower than that of the high-voltage battery, and which can be charged by output power from the high-voltage battery, the method comprising:
  a detection step of detecting an occupant; and
  a control step of:
    performing charging/discharging control for the high-voltage battery and the low-voltage battery; and
    performing feeding control for causing the high-voltage battery to supply power to a predetermined on-vehicle device when a condition including at least that the occupant is detected is satisfied in a state in which a main switch of the vehicle is not on.

* * * * *